United States Patent [19]
Banyas et al.

[11] 3,762,504
[45] Oct. 2, 1973

[54] LUBRICATION SYSTEM FOR ENDLESS CHAIN CONVEYORS

[76] Inventors: John D. Banyas, 2544 Lambert Dr., Toledo; Edward A. Ross, 832 Michigan Ave., Waterville, both of Ohio

[22] Filed: June 29, 1972

[21] Appl. No.: 267,677

Related U.S. Application Data
[62] Division of Ser. No. 77,425, Oct. 2, 1970.

[52] U.S. Cl. ............................................. 184/15 A
[51] Int. Cl. ............................................. F16n 7/14
[58] Field of Search .............. 184/15 R, 15 A, 15 B, 184/2, 3 R

[56] References Cited
UNITED STATES PATENTS

| | | | |
|---|---|---|---|
| 2,920,720 | 1/1960 | Hemsley | 184/15 A |
| 2,998,865 | 9/1961 | Geissler | 184/15 A |
| 1,677,649 | 7/1928 | Morgan | 184/15 A |
| 1,933,464 | 10/1933 | West et al. | 184/15 A |

FOREIGN PATENTS OR APPLICATIONS

| | | | |
|---|---|---|---|
| 240,934 | 10/1925 | Great Britain | 184/15 R |

*Primary Examiner*—Manuel A. Antonakas
*Attorney*—J. R. Nelson et al.

[57] ABSTRACT

A lubrication system for periodically lubricating the chain of an endless chain conveyor. A star wheel carrying a lubrication discharge fitting on one arm is mounted for rotation coaxial with a constant radius end turn section of an endless chain conveyor. The ends of the arms of the star wheel are engaged by the chain pins of the conveyor as the pins pass around the end turn section to drive the star wheel in rotation coordinated with movement of the chain. A lubricant supply is connected to the discharge fitting and a control system, when actuated, is operaable to reciprocate the lubricant discharge fitting into seated engagement with a lubricant receiving fitting on a chain pin traversing the end section, to discharge a charge of lubricant from the supply into the pin while the two fittings are engaged, and to retract the discharge fitting clear of the receiving fitting of the pin before the pin leaves the end turn section. A lubricant fitting is mounted on only one of several arms of the star wheel and thus the fitting does not engage adjacent chain pins in succession. The number of arms on the star wheel is related to the number of pins on the chain so that every pin on the chain is lubricated once before any given pin is lubricated twice.

1 Claim, 9 Drawing Figures

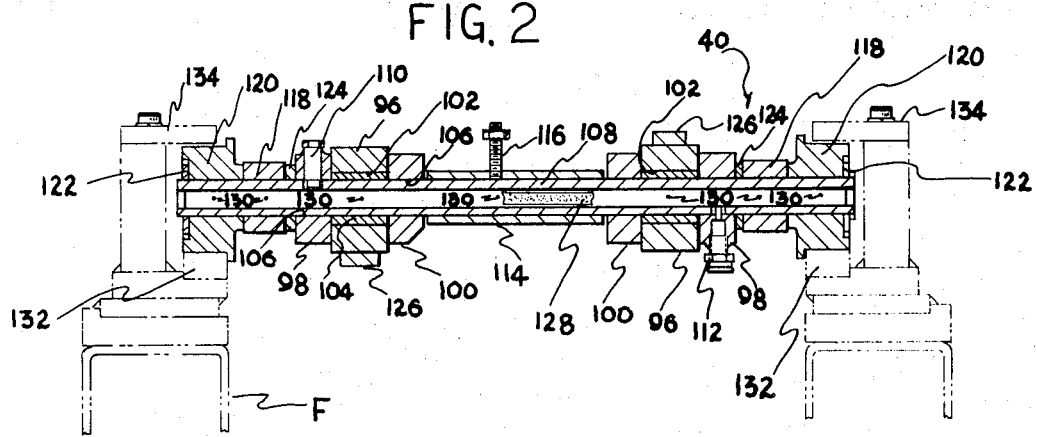

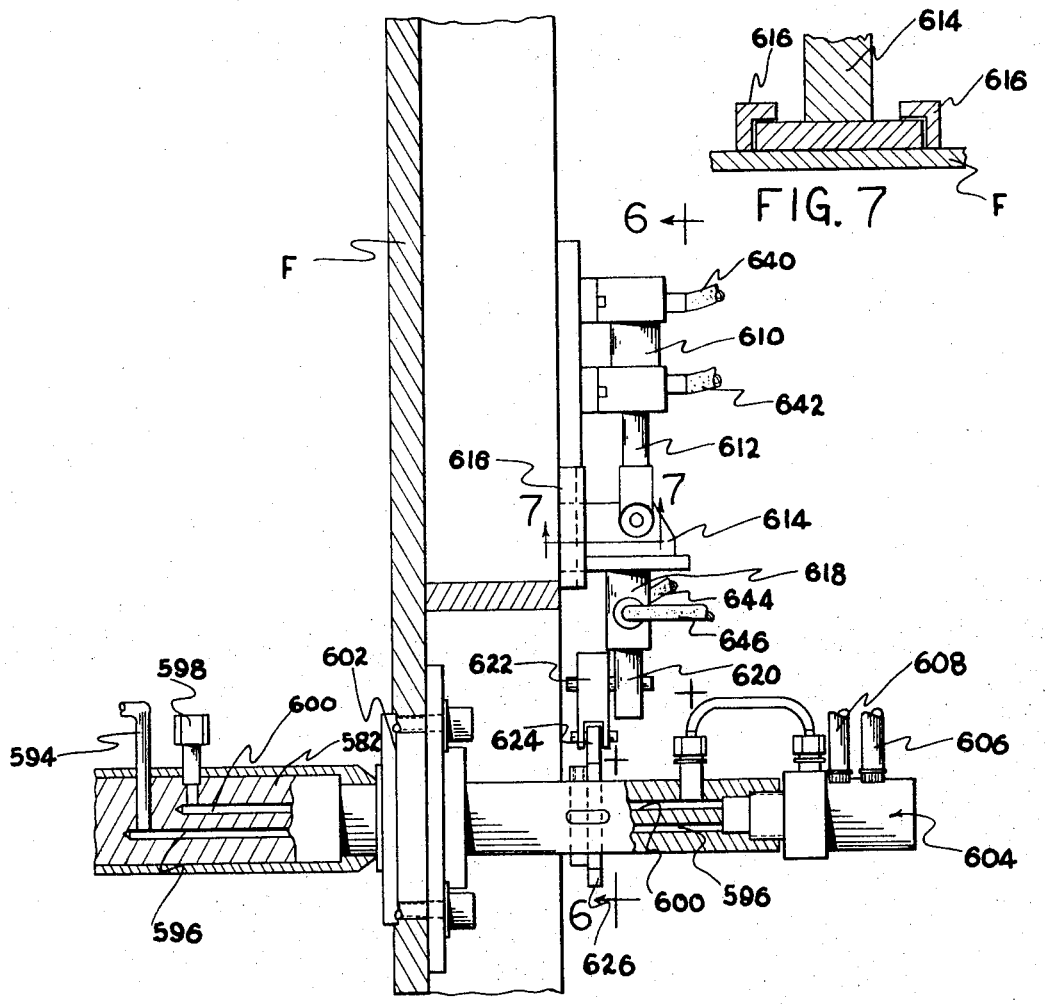
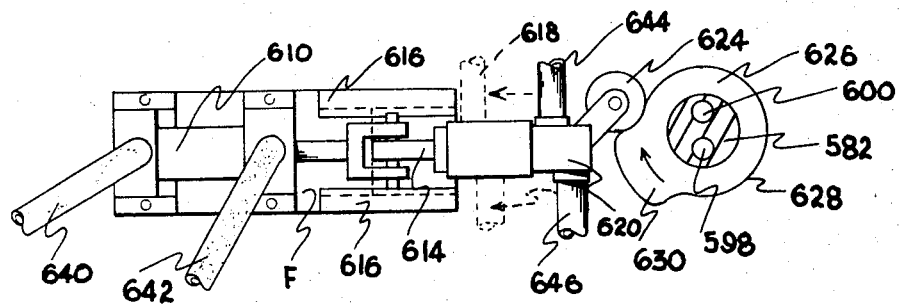

LUBRICATION SYSTEM FOR ENDLESS CHAIN CONVEYORS

REFERENCE TO RELATED APPLICATIONS

This application is a division of our co-pending application Ser. No. 77,425, filed Oct. 2, 1970.

SUMMARY OF THE INVENTION

The lubrication system of the present invention is employed to lubricate the chain pins of an endless chain conveyor while the conveyor is in operation. Although it is obviously well adapted for use in other environments, the present lubrication system was originally designed for use in lubricating an endless chain conveyor of a machine employed on a glass container production line which is intended to remain in continuous 24-hour-a-day operation over long periods of time. The basic requirements for a lubrication system of this type are that it be capable of periodically supplying an accurately metered amount of lubricant to each individual chain pin on the fly.

In accordance with the present invention, each pin of the conveyor chain is provided with a lubricant receiving fitting from which lubricant, by means of an internal wick and appropriately located lubricant passages, can be distributed through the interior of the pin to all rubbing or relatively movable surfaces. The conveyor chain is mounted upon a machine frame for movement along an endless path which has at least one end turn section of constant radius. A multi-armed star wheel is mounted upon the machine frame for rotation about an axis coaxial with the constant radius end turn section. The star wheel is driven in rotation by the engagement between its arms and the pins of the chain as the chain pin moves around the constant radius end section, thus maintaining each arm of the star wheel in engagement with a chain pin while the pin is transmitting the constant radius section of its path.

On one arm of the star wheel, a lubricant discharge fitting is mounted for reciprocation radially of the wheel between a retracted position clear of the path of movement of the lubricant receiving pins on the chain, and an extended position in which the discharge fitting on the star wheel is sealingly seated upon the receiving fitting of the pin.

The lubricant discharge fitting is reciprocated under the control of a pneumatic motor which is connected into a control system which normally maintains the discharge fitting in its retracted position. A supply of lubricant for the discharge fitting and a source of air for the pneumatic motor are led to the fitting and motor respectively via the hub of the star wheel which also carries a cam which mechanically actuates a control valve at the appropriate rotative position of the star wheel. The control system is normally maintained in a non active position because it is desired to perform a lubricating operation only periodically.

When the system is actuated to perform a lubricating operation, the control valve which is actuated by the cam carried on the star wheel is mechanically shifted relative to the machine frame so that the valve actuator is projected into the path of movement of the cam. The cam is rotatively oriented relative to the arm which carries the lubricant discharge fitting so that the pneumatic motor is actuated to seat the discharge fitting on the receiving fitting of a chain pin as the pin begins its movement along the constant radius section of its path. Actuation of the control valve by its engagement with the cam is also employed to operate a second pneumatic motor which forces a metered charge of lubricant under pressure through the discharge fitting into the receiving fitting of the chain pin. Actuation of the second pneumatic motor is delayed within the control system to assure that the lubricant fittings are sealed to each other before the charge of lubricant is pressurized. At a predetermined later rotative position of the star wheel, the cam is disengaged from the control valve to cause the first pneumatic motor to retract the discharge fitting clear of the chain pin fitting before the chain pin passes from the constant radius turn section of its path. A check valve in the discharge fitting is automatically seated when the fittings are disengaged to prevent dripping of lubricant.

In the particular machine disclosed in this application, the spacing between adjacent chain pins is relatively small as compared to the radius of the end turn section of the chain pin path and the circumferential extent of the constant radius section of the chain pin path is slightly less than 180° measured about the star wheel axis. For simplicity, in this situation the star wheel is constructed with four symmetrically disposed arms which with the particular dimensions of the machine disclosed engage every fourth chain pin. Because the lubricating fitting is mounted on only one of the four arms of the star wheel, this means that while a lubrication operation is being conducted, lubricant is supplied to every sixteenth pin which passes around the end turn section. To assure that each pin is lubricated once before any pin is lubricated twice, in this situation the number of chain pins is selected to be an even multiple of 16 plus one — i.e., 177 chain pins in the specific machine under consideration.

Other objects and features of the invention will become apparent by reference to the following specification and to the drawings.

IN THE DRAWINGS

FIG. 2 is a detail cross sectional view, taken on line 2—2 of FIG. 3 showing details of the chain link pin construction;

FIG. 3 is a detail plan view of a portion of the conveyor chain of the machine of FIG. 1;

FIG. 5 is a detail cross sectional view, taken on a plane passing through the main shaft axis, showing further details of the lubricating mechanism;

FIG. 6 is a detail cross sectional view taken on line 6—6 of FIG. 5;

FIG. 7 is a detail cross sectional view taken on line 7—7 of FIG. 5;

GENERAL DESCRIPTION OF THE MACHINE

Figure 1:
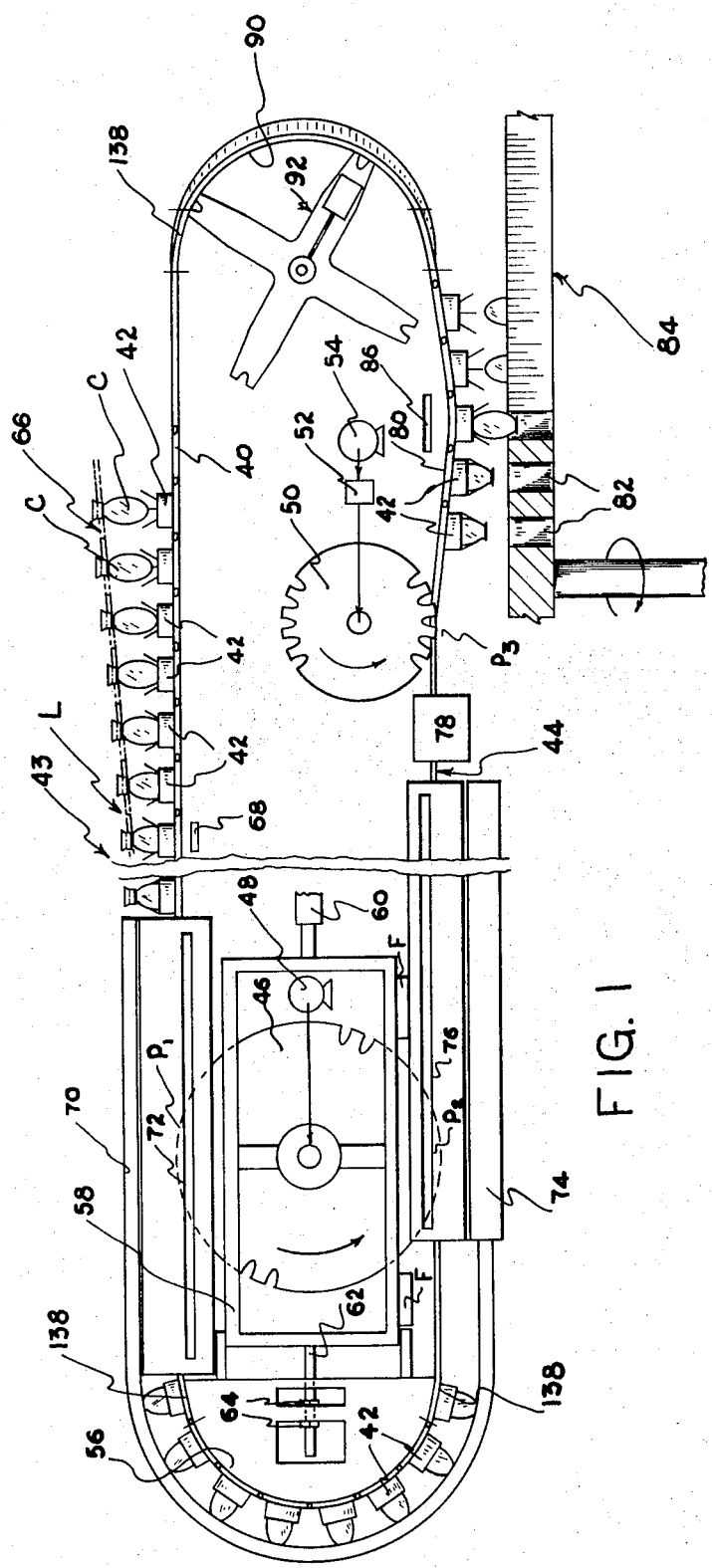
FIG. 1 is a schematic side elevational diagram on a machine employing the lubricating system of the present invention.

In FIG. 1, there is shown a schematic view of an exemplary form of a machine with which the lubrication system of the present invention may be employed. The machine of FIG. 1 includes an endless chain conveyor 40 which is mounted for movement along an endless path and carries a series of uniformly spaced glass container holding chucks 42. Glass containers C are loaded into chucks 42 at a loading station L on the upper run 43 of the chain, the chain 40 being driven in a counterclockwise direction as viewed in FIG. 1. Chain 40 is driven in movement by a main drive sprocket 46 which meshes with chain 40 at a point P1 on upper run 43 of the chain and also at a point P2 on lower run 44 of the chain. Sprocket 46 is driven in rotation by a main drive motor 48, the driving force supplied by motor 48 being augmented by a slave drive sprocket 50 meshing with lower run 44 of chain 40 at point P3, sprocket 50 being driven by the slave drive motor 54 operating through a slip clutch 52. The chain is supported for movement along its path from the machine frame F and passes around stationary frame section at the end of its end turn. At the left hand end, an end frame section 56 is adjustable in a left to right direction as viewed in FIG. 1 to regulate chain tension, section 56 being shiftable relative to the fixed portions of the frame by mechanism which includes elements 60, 62 and 64.

Subsequent to being loaded into chucks 42 at loading station L, the glass containers C are conveyed by chain 40 through a first heating section 70 during which the containers are rotated by a spin cycle mechanism 72. After passing around end turn 56, the containers pass through a second burner section 74 which performs a forming operation on the containers, the containers again being driven in rotation by a spin cycle mechanism 76. The containers are then inspected at stations 78, pass onto an unloading section 80 and are deposited in pockets 82 in a take out conveyor 84. After leaving unloading station 80, chain 40 passes around a fixed end turn section 90 of constant radius, and the constant end section 90 being coupled to the upper and lower run portions by relatively short sections of a varying radius 138 for purposes described in greater detail in parent application Ser. No. 77,425. It is at this constant radius end section 90 that the lubrication system designated generally 92 of the present invention is operable.

It will be noted that in the specific machine disclosed, the lubricant system is located relative to the operating portions of the machine such that it does not become involved with the main tension adjustment applied at moveable end turn 56, is relatively remote from the burner elements 70 and 74, and operates on the chain at a portion of the chain path where chucks 42 are empty.

CHAIN PIN CONSTRUCTION

The structure of endless chain 40 is best shown in FIGS. 2 and 3. Referring first to FIG. 3, chain 40 includes a plurality of pairs of transversely spaced rigid links designated generally 94, each formed with an integral single hub 96 at one end and a pair of transversely spaced hubs 98, 100 at its opposite end, the spacing between hubs 98 and 100 being dimensioned to slidably receive a hub 96. Links 94 on the right and left-hand sides of the chain as viewed in FIG. 3 are identical, the links 94 on the right-hand side of the chain being inverted with respect to the links on the opposite side of the chain. Thus, the hubs 100 are always disposed inwardly of the single hubs 96, while the hubs 98 are always located outboard of the single hub 96.

Referring now to FIG. 2, it is seen that hub 96 is bored as at 102 and a plain bearing 104 is mounted within this bore. Hubs 98 and 100 are coaxially bored as at 106, the successive links being coupled to each other by a hollow link pin 108 which passes through bores 106 of the spaced hubs 98, 100 and through bushing 102 of the single hubs 96. Link pin 108 is freely rotatable within the bushings 102, however, to minimize wear on the pin, hubs 98 and 100 are locked to pin 108 by a plain set screw 110 at the left-hand side of the chain as viewed in FIGS. 2 and 3.

A tubular sleeve 114 is mounted for free rotation and a small degree of limited axial movement on pin 108 between the inner link hubs 100. A threaded stud 116 is fixedly secured to and projects radially outwardly from sleeve 114.

Link pin 108 projects axially outwardly beyond the outer hubs 98 of the links to rotatably support a pair of drive rollers 118 and a pair of support rollers 120 at locations outboard of links 94.

Referring to FIG. 3, an intermediate drive roller 118a is rotatably mounted on each link 94 midway between each pair of pin supported drive rollers 118.

A lubricant wick, partially indicated at 128, is mounted in the hollow interior of link pin 108 to transfer lubricant supplied to fitting 112 in a manner to be described in detail below, over the entire interior of pin 108. The lubricant is in turn transferred from wick 128 to the rotary bearing surfaces of the link pin via radial bores 130.

The endless chain 40 is supported and guided in movement by its support rollers 120 which ride on track sections 132 mounted on the fixed frame F of the machine.

The support track section including track 132 illustrated in FIG. 2 is a typical section, the particular portion shown being that at some point of one of the horizontal runs of the conveyor. The end turn sections of the track are functionally similar and constructed by fixedly mounting inner and outer track sections 132 and 134 onto a rigid plate such as 136, (See FIG. 4).

CHAIN LUBRICATION SYSTEM

Figure 4:
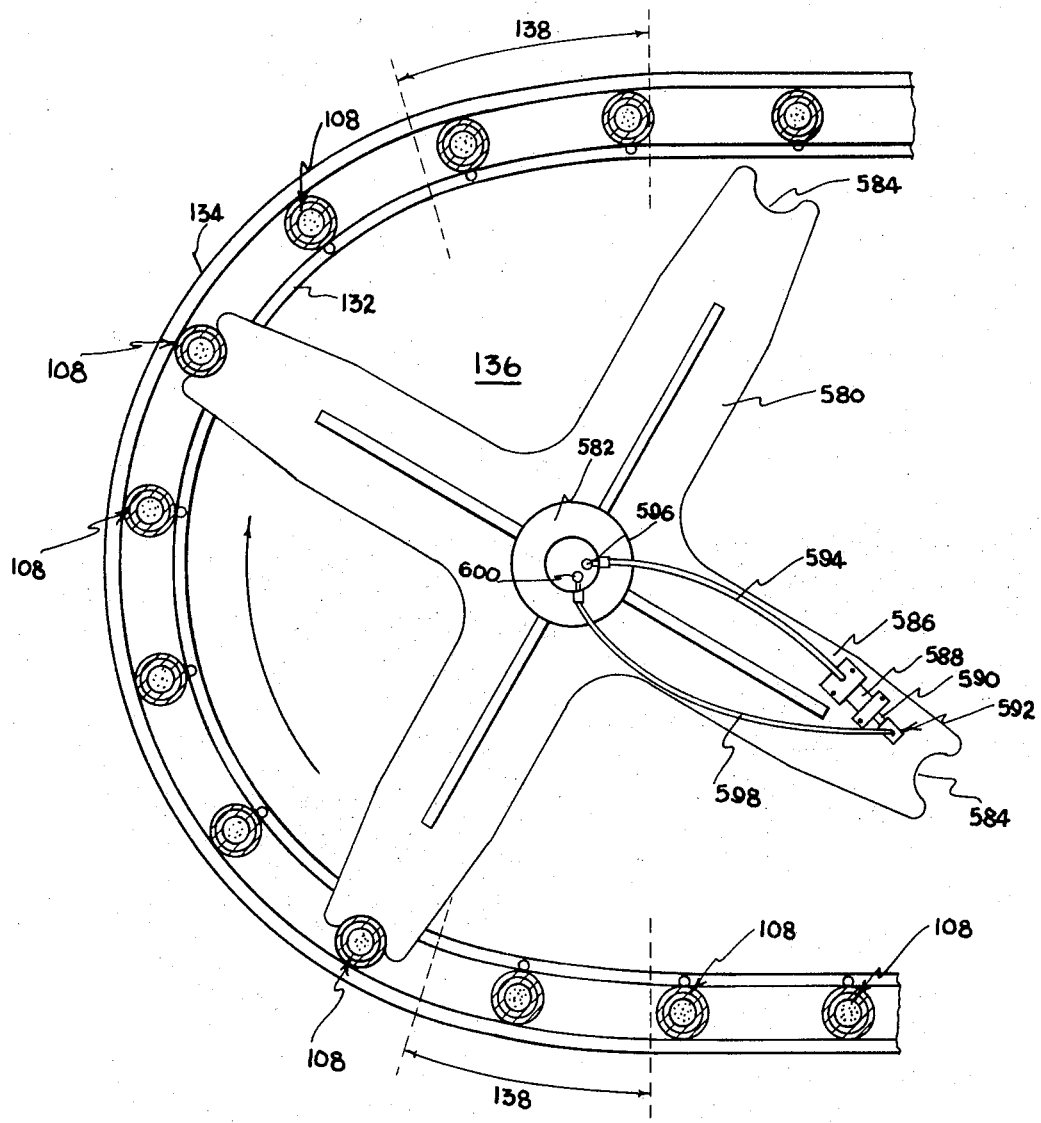
FIG. 4 is a side elevational view, partially in cross section, of a portion of the chain lubricating mechanism.

Details of chain lubrication system 92 are shown in FIGS. 4 through 9. Referring first to FIG. 4, lubrication mechanism 92 includes a rotary member in the form of a four-armed star wheel 580 mounted upon a shaft 582 rotatably supported in machine frame F. The axis of rotation of shaft 582 is coincident with the center of curvature of the constant radius section of end turn 90, and as indicated in FIG. 4 the radial length of the arms of wheel 580 is such that the wheel is driven in rotation by the engagement of chain pins 108 in notches 584 formed in the distal end of the arms. One arm 586 of the wheel 580 carries the cylinder of a pneumatic motor 588 whose piston rod 590 carries a lubricant discharge fitting designated generally 592. A conduit 594 connects the head end of the cylinder of motor 588 to an air passage 596 bored in shaft 582, while a lubricant conducting conduit 598 is connected between lubricant discharge fitting 592 and a second passage 600 in shaft 582.

Referring now to FIG. 5, it is seen that one end of shaft 582 is supported in a bearing assembly 602 in machine frame F and projects outwardly through bearing 602 to the exterior of the machine frame. At the outer end of shaft 582, a rotary coupling union 604 connects passages 596 and 600 in shaft 582 to stationary conduits 606 and 608 respectively, conduit 606 conducting air under pressure to or from motor 588, while conduit 608 is connected, in a manner to be described below, to supply lubricant to lubricant discharge fitting 592.

A second pneumatic motor 610 has its cylinder fixedly mounted upon machine frame F. The piston rod 612 of motor 610 is connected to a slide bracket 614 which is mounted for sliding movement upon machine frame F guided by a gib assembly designated generally 616. Bracket 614 carries a three-way valve 618 having a shiftable valve actuating member 620 which carries a cam follower member 622 which includes a follower roller 624. Roller 624 can be positioned to ride on the periphery of an actuating cam 626 fixedly secured to and rotatable with shaft 582. As best seen in FIG. 6, cam 626 is formed with a reduced diameter section 628 extending around the major portion of the cam periphery, and an enlarged section or lobe 630.

Figure 8:
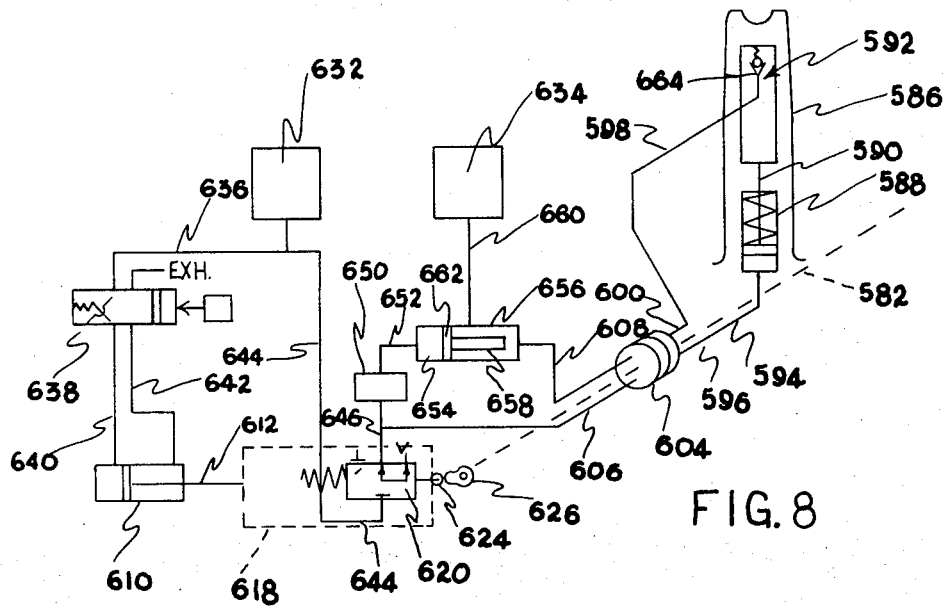
FIG. 8 is a schematic diagram of the lubricant mechanism control system.
Figure 9:
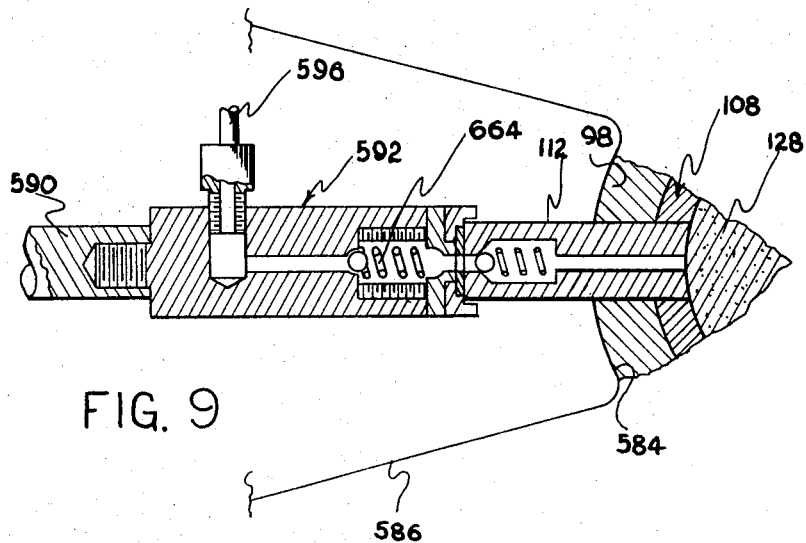
FIG. 9 is a detail cross sectional view of the lubricant discharge fitting.

The operation and interrelationship of the various components described thus far is best explained by reference to the schematic diagram of FIG. 8 which shows the air and lubricant supply systems. Referring to FIG. 8, a source of air under pressure is schematically illustrated at 632, while a supply of lubricant is indicated at 634. The system as shown in FIG. 8 is shown in its inoperative or non-lubricating condition.

Air under pressure from source 632 is conducted via conduit 636 to an inlet port of a solenoid actuated spring return four-way reversing valve schematically illustrated at 638. Valve 638 controls the venting and supply of pressure to motor 610 via head end and rod end conduits 640 and 642 respectively. In the non-lubricating condition shown in the diagram of FIG. 8, the solenoid which controls valve 638 is de-energized, and the valve spring positions the valve to connect pressure conduit 636 to head end conduit 642 of motor 610 while at the same time connecting rod end conduit 640 to the exhaust port of valve 638. This set of connections establishes a condition which maintains the piston rod 612 of motor 610 in its fully retracted position which withdraws mounting bracket 614 and valve 618 to the left as viewed in FIG. 8 to a position such that cam follower roller 624 on valve actuator 620 is drawn clear of actuating cam on rotary shaft 582.

A second pressure conduit 644 is connected between air pressure source 632 and the inlet port of three-way valve 618. Actuator 620 is biased by a spring within valve 618 to its extreme right-hand limit of movement, at which the valve inlet port connected to conduit 644 is blocked. An outlet port of valve 618, in this position of actuator 620 is connected within the valve to a vent port V.

Conduit 646 is connected directly to conduit 606 which, via rotary coupling union 604, passage 596 and conduit 594 is connected to the head end of pneumatic motor 588. As indicated in FIG. 8, motor 588 is of the spring return type, hence the connection shown in FIG. 4 which vents the head end of motor 588 via valve 618 enables its spring to bias piston rod 590 to its fully retracted position, thus locating discharge fitting 592 retracted clear of lubricant receiving fittings 112 on link pins 108.

Conduit 646 is also connected via a sequence valve 650, which functions as a flow restrictor, and a conduit 652 to the air chamber 654 of a lubricant pump 656. Pump 656 also includes a lubricant chamber 658 which is connected to lubricant supply 634 via conduit 660 and also connected via conduit 608, rotary union 604, passage 600 and conduit 598 to lubricant discharge fitting 592. In the absence of air under pressure in air chamber 654, no pressure is applied to the piston interface 662 between air chamber 654 and lubricant chamber 658 of lubricant pump 656. Discharge of lubricant from discharge fitting 592 in this condition is prevented by a spring-loaded check valve 664, see also FIG. 9.

To shift the system of FIG. 8 to its lubricant supplying condition, the solenoid of valve 638 is energized to reverse the connections of valve 638 from those illustrated in FIG. 8 — that is to connect pressure conduit 636 to head end conduit 640 while at the same time connecting rod end conduit 642 to vent. This set of connections causes piston rod 612 of motor 610 to be driven to the right from the FIG. 8 position to shift valve 618 bodily to the right as viewed in FIG. 8, thus moving actuating roller 624 of valve actuator 620 into engagement with the periphery of cam 626. This position of the valve, actuator and cam is that shown in FIGS. 5 and 6. Referring briefly to FIG. 6, when motor 610 has been actuated to position follower roller 624 in engagement with the periphery of cam 626, the small diameter section 628 of the cam will merely rest against roller 624 while valve actuator 620 stays in the extended position illustrated in FIG. 8. However, when cam 626 is rotated to a position where its large diameter lobe 630 is engaged with roller 624, valve actuator 620 is shifted to the left from the position illustrated in FIG. 8, which action seals vent port V and connects conduit 644 to conduit 646.

Referring to FIG. 4, the angular position of lobe 630 upon shaft 582 is fixed with respect to that arm 586 which carries pneumatic motor 588. The orientation of roller 624 is such that it is engaged and depressed by lobe 630 only when arm 586 has a link pin 108 in seated engagement with its notch 584. The angular extent of lobe 630 about the axis of shaft 582 is such that valve actuator 620 will be depressed while arm 586 is moving with an aligned link pin 108 from approximately the 7 o'clock position of FIG. 4 to the 11 o'clock position.

As stated above, depression of valve actuator 620 by lobe 630 of the operating cam directly connects pressure conduit 644 to conduit 646, and air under pressure promptly flows from conduit 646 through conduit 606, rotary union 604, passage 596 and conduit 594 to the head end of motor 588. The supply of pressure to motor 588 causes its piston rod 590 to stroke outwardly, thereby driving the attached lubricant discharge fitting 592 into seated engagement with the lubricant receiving fitting 112 on that chain pin 108 which, at this time, is operatively engaged by arm 586.

Air under pressure also flows from conduit 646 through sequence valve 650 and conduit 652 into air chamber 654 of the lubricant pump 656. The pressurizing of air chamber 654 is delayed by sequence valve 650 so that no effective pressure is supplied to lubricant pump 656 until after discharge fitting 592 has been seated upon lubricant receiving fitting 112.

Upon the supply of pressure to air chamber 654, interface piston 662 is driven to the right a preselected distance to discharge a charge or pulse of lubricant under pressure into conduit 608, this pressure pulse of lubricant passing through rotary union 604, passage 600 and conduit 598 into discharge fitting 592. The pressure of lubricant thus supplied to fitting 592 is sufficient to unseat ball check valve 664 and the lubricant flows from discharge fitting 592 into the receiving fitting 112 on link hub 98. As explained above, lubricant is distributed axially within link pin 108 by the wick 128 carried in the interior of the pin.

At a point in time before arm 586 is disengaged from the chain pin, lobe 630 of the cam 626 rotates past actuating roller 624 which then drops onto the small diameter section 628 of the cam, thereby permitting valve actuator 620 to return to the position illustrated in FIG. 8. This action connects conduit 646 to vent port V, thereby venting motor 588 and air chamber 654, the venting of motor 588 retracting lubricant discharge fitting 592 clear of the fitting 112 on the chain pin. With air chamber 654 of the lubricant pump vented, the pressure on the lubricant side of interface piston 662 is insufficient to unseat ball check valve 664.

Returning to FIG. 4, it is seen that the adjacent arms of wheel 580 engage every fourth chain pin 108, and because lubricant fitting 592 is mounted on only one of the four arms, this means that in the disclosed embodiment while the lubrication system is in operation, it lubricates every sixteenth link pin. Where this relationship is employed, chain 40 is formed with a number of link pins which exceeds an even multiple of 16 by 1. In the machine shown in this application, 177 link pins 108 are employed, and thus the lubrication system when operating will lubricate every pin in the chain once before lubricating any one pin twice.

Normally, the lubrication system is operated only periodically during operation of the machine, preferably under the control of an automatic timer.

We claim:

1. In combination with an endless chain conveyor having a frame, an endless chain having a plurality of uniformly spaced transversely extending link pins, and means defining an endless path of movement for said chain on said frame, said path having at least one direction changing section of constant radius; a lubricating system comprising a rotary member mounted on said frame for rotation about an axis coincident with the center of said constant radius section for driving said rotary member about said axis in synchronism with the movement of said pins about said section, a lubricant receiving fitting on each of said pins, a lubricant discharge fitting mounted on said rotary member for rotation therewith, first fluid pressure actuated motor means operable when supplied with pressure to shift said discharge fitting from a normally maintained retracted position into seated engagement with the receiving fitting of a pin aligned therewith, a fluid pressure actuated lubricant supply pump operable where supplied with pressure to supply a charge of lubricant to said discharge fitting, a fluid pressure source, a valve having a housing mounted for movement between an inactive and an active position and a valve member movable within said housing between an open position and a normally maintained vent position, second fluid pressure actuated motor means operable when connected to said source to position said valve in said active position, cam means rotatable with said rotary member and engageable with said valve member when said housing is in said active position to position said valve member in said open position for a selected arc of rotation of said rotary member, said valve member being operable in said open position to connect said source to said first motor means and said pump, and a sequence valve connected between said valve means and said pump to cause said motor to seat said fittings before the charge of lubricant arrives at said discharge fitting.

* * * * *